Patented Feb. 1, 1938

2,106,976

UNITED STATES PATENT OFFICE 2,106,976

NEUTRALIZATION OF ACID TREATED OIL

John McArthur Harris, Jr. and Norman F. Black, Baton Rouge, La., assignors to Standard Oil Development Company, a corporation of Delaware No Drawing. Application December 17, 1935, Serial No. 54,950

4 Claims. (Cl. 196—41)

The present invention resides in a process for neutralizing petroleum oils which have been acid treated and more particularly to such a process in which a novel method for the separation of the neutral oil and the products of neutralization is employed.

In order to sweeten acid treated oils, it has been customary to add caustic soda to the oil, separate the oil from the aqueous solution of neutralization products by decantation, and wash the separated oil free from caustic. In this method, difficulty is encountered by reason of emulsification of the oil in the caustic solution, whereby separation of the two is not clean cut and oil losses are encountered.

Moreover the caustic neutralized oil must be water washed and subjected to a brightening treatment for the removal of water. In addition, where an oil is given a heavy treat with 98% sulfuric acid, neutral oil soluble dialkyl sulfates are often formed. These are not removed by caustic washing. When the oil is heated they decompose with the evolution of $SO_2$ and therefore constitute undesirable constituents in the oil.

According to the present invention all the above difficulties are avoided and the steps of neutralization, washing and blowing are all replaced by the simple step of blowing the oil with ammonia at an elevated temperature. The temperature employed is sufficiently high to cause the sublimation of ammonium sulfate formed by the neutralization. It is particularly desirable to use the ammonia in a highly diluted state, the diluent being a non-oxidizing gas such as natural gas, nitrogen, hydrogen, etc. The use of the diluent not only decreases the cost of the operation but decreases the temperature at which the ammonium sulfate will sublime and increases the brightening effect of the treatment.

The treatment according to the present invention finds its most useful application in the neutralization of acid treated lubricating oils. In general it may be said that the neutralization is conducted at a temperature sufficiently high to cause the sublimation of the ammonium sulfate formed, but not above the initial point of the oil. The temperature may be well above the decomposition temperature of ammonium sulfate since even if the ammonium sulfate is decomposed into its constituents these recombine in the cooling zone causing the deposition of ammonium sulfate. The production of a substantially pure ammonium sulfate as a by-product constitutes one of the practical advantages of this process.

In a practical embodiment of the present invention a dewaxed lubricating oil having a viscosity of 70 seconds Saybolt at 210° F. was treated with 20 pounds per barrel of 98% sulfuric acid. The oil recovered after the removal of the sludge was blown for one hour at 400° F. with a mixture of ammonia and methane containing 25% of ammonia. The resulting oil was bright and neutral. No emulsification difficulties were encountered. Consequently no oil was lost. The ammonium sulfate was deposited in a cool receiver in a practically pure state. The resulting oil contained no dialkyl sulfates since at the treating temperature these were decomposed and the evolved sulfur dioxide was carried away and neutralized.

It is to be understood that the process of the present invention is not restricted to the utilization of any particular operating temperatures but only to those which are suitable for the achievement of the desired result and which will be apparent to one skilled in the art. The treatment can be conducted at atmospheric or reduced pressure. No particular ratio of inert gas to ammonia is required although the latter usually constitutes a minor constituent of the gas mixture when an inert gas is employed.

The nature and objects of the present invention having been thus described and a practical illustration of the same having been given, what is claimed as new and useful and is desired to be secured by Letters Patent is:

1. A process for neutralizing sulfuric acid treated lubricating oil which comprises blowing the oil with ammonia gas at a temperature above the sublimation temperature of ammonium sulfate, whereby ammonium sulfate is carried off in the evolved gases and deposited upon the cooling of the latter.

2. A process according to claim 1 in which the ammonia is used in conjunction with a non-oxidizing gas.

3. A process for neutralizing sulfuric acid-treated oil having an initial boiling point above the vaporization temperature of ammonium sulfate, which comprises blowing the oil with ammonia at a temperature between the vaporization temperature of ammonium sulfate and the initial boiling point of the oil to thereby cause the ammonia to react with the sulfur-containing compounds in said oil to produce ammonium sulfate and to vaporize the ammonium sulfate so formed and separate the same from said oil.

4. A process for neutralizing sulfuric acid-treated oil having an initial boiling point above the vaporization temperature of ammonium sulfur salts formed by said neutralization, which comprises blowing the oil with a non-oxidizing gas containing a substantial amount of ammonia at a temperature above the vaporization temperature of the salts formed by reacting said ammonia with sulfur compounds contained in said oil as a result of said sulfuric acid treatment, but below the initial vaporization point of said oil whereby the ammonium sulfur salts formed during the neutralization are removed from said oil in the form of vapors.

NORMAN F. BLACK.
JOHN McARTHUR HARRIS, Jr.